United States Patent

Hirayama et al.

[11] Patent Number: 5,845,326
[45] Date of Patent: Dec. 1, 1998

[54] COMPUTER SYSTEM AND METHOD FOR OBTAINING MEMORY CHECK POINTS AND RECOVERING FROM FAULTS USING THE CHECKPOINTS AND CACHE FLUSH OPERATIONS

[75] Inventors: Hideaki Hirayama, Kanagawa-ken; Kuniyasu Shimizu, Tokyo, both of Japan

[73] Assignee: Kabushiki Kaisha Toshiba, Kawasaki, Japan

[21] Appl. No.: 665,544

[22] Filed: Jun. 18, 1996

[30] Foreign Application Priority Data

Jun. 19, 1995 [JP] Japan .................................... 7-151739

[51] Int. Cl.⁶ ............................. G06F 13/00; G06F 12/16
[52] U.S. Cl. ..................... 711/135; 395/182.13; 395/569; 711/143
[58] Field of Search ..................................... 711/135, 161, 711/162, 143; 395/182.04, 182.05, 182.13, 569

[56] References Cited

U.S. PATENT DOCUMENTS

| 4,740,969 | 4/1988 | Fremont ................................. 371/12 |
| 5,418,916 | 5/1995 | Hall et al. .............................. 395/569 |
| 5,659,721 | 8/1997 | Shen et al. ............................. 395/569 |

FOREIGN PATENT DOCUMENTS 163096  12/1985  European Pat. Off. .

OTHER PUBLICATIONS

Wu et al., "Error Recovery in Shared Memory Multiprocessors Using Private Caches," IEEE, vol. 1, No. 2 (Apr. 1, 1990).

*Primary Examiner*—Glenn Gossage
*Attorney, Agent, or Firm*—Finnegan, Henderson, Farabow, Garrett & Dunner, L.L.P.

[57] ABSTRACT

A computer system including a plurality of processors and a copyback cache memory and a method for periodically obtaining a first and second phase memory checkpoints and recovering from faults using the checkpoints, are disclosed. The computer system has cache flush hardware for executing a cache flush operation independently of the processors, including cache flush starters for starting the cache flush hardware, and cache flush end detectors for detecting the end of the cache flush operation. During a first phase checkpoint, the cache flush and normal data processing are done in parallel. When the cache flush end detectors detect the termination of the cache flush hardware, the processors suspend normal data processing, and a second checkpoint step is executed in which the processors save the context of the processors in the main memory and the cache flush hardware is invoked again so that dirty data in the cache memory is written back in to the main memory.

10 Claims, 7 Drawing Sheets

COMPUTER SYSTEM AND METHOD FOR OBTAINING MEMORY CHECK POINTS AND RECOVERING FROM FAULTS USING THE CHECKPOINTS AND CACHE FLUSH OPERATIONS

BACKGROUND OF THE INVENTION

The present invention relates to a checkpoint recovery computer system with a copyback type cache memory, and especially to a technique for shortening the checkpoint acquisition time into the main memory by efficiently using cache flush hardware.

A checkpoint recovery computer system is a robust computer system in which a checkpoint is taken periodically during normal data processing. When a fault occurs, after a proper recovery operation, normal data processing is restarted at the latest checkpoint without the system going down.

Some checkpoint recovery computer systems take a checkpoint in the main memory. In such a computer system, with a copyback type cache memory, modified data within the cache memory should be written back into the main memory, thereby flushing the cache memory. This enables the computer system to restart normal data processing without using the cache memory, which might be damaged by a fault.

In conventional computer systems, as a major step of a checkpoint operation, the cache flush operation is executed by cache handling processor instructions or cache flush hardware attached to the computer system. There are two problems with such checkpoint operations. One is performance degradation occurring because normal data processing is suspended during the checkpoint operation. The other is that the computer system seems to stop completely during such checkpoint processing. For example, an interrupt from an external device can not be handled during this period, which limits the running of other applications of the computer system. These problems become more serious as the cache memory capacity grows.

Accordingly, a primary purpose of the present invention is to reduce performance degradation caused by an extended checkpoint operation.

Another purpose of the present invention is to reduce the inoperational time of the computer system during checkpoint operation.

Additional objectives, features, and advantages of the invention will be set forth in the description which follows, and in part will be apparent from the description, or may be learned by practice of the invention. The objectives and other advantages of the invention will be realized and attained by means of the instrumentalities and combinations particularly pointed out in the written description and appended claims hereof, as well as the appended drawings.

DESCRIPTION OF THE INVENTION

In accordance with the present invention, the foregoing objects, among others, are achieved by providing a computer system having a processor, a main memory, and a copyback type cache memory wherein, the computer system periodically stores contents of the cache memory into the main memory to get a checkpoint on the main memory, and achieves a recovery from a fault by restarting from the checkpoint when a fault occurs, the computer system further comprising cache flush execution means for flushing the cache memory independently of normal data processing, cache flush start means for invoking the cache flush execution means, cache flush end detection means for detecting whether the cache flush execution means has finished flushing the cache memory, first phase checkpoint means for invoking the cache flush execution means and for performing the normal data processing until the cache flush end detection means detects that the cache flush execution means finishes flushing the cache memory, and second phase checkpoint means for suspending the normal data processing, and for saving a content of the processor into the main memory, for invoking the cache flush execution means, and for waiting for termination of the cache flush execution means detected by the cache flush end detection means.

In accordance with another aspect of the present invention, the objects are achieved by providing a computer system having a processor, a main memory, a copyback type cache memory, the computer system periodically storing contents of the processor and the cache memory in the main memory to get a checkpoint on the main memory, and achieving a recovery from a fault by restarting from the checkpoint when a fault occurs, the computer system comprising cache flush execution means for flushing the cache memory independently of processing by the processor, start means for invoking the cache flush execution means, end detection means for detecting whether the cache flush execution means finishes flushing the cache memory; and stops means for stopping the execution of the cache flush execution means.

There has also been provided, in accordance with yet another aspect of the present invention, a method of periodically storing contents of a processor and a cache memory into a main memory to get a checkpoint on the main memory and to recover from a fault by restarting from the checkpoint when a fault occurs, the method comprising the steps of executing a first phase checkpoint step where a cache flush execution and normal data processing are performed simultaneously, detecting whether the first phase checkpoint step is complete, and executing a second phase checkpoint step, wherein a cache flush execution is performed and any normal data processing is suspended until completion of the second phase checkpoint step.

Other objects, features, and advantages of the present invention will become apparent from the following detailed description. It should be understood, however, that the detailed description and specific embodiments, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The accompanying drawings, which are incorporated in and constitute a part of the specification, illustrate presently preferred implementations of the invention and, together with the general description given above and the detailed description of the preferred implementations given below, serve to explain the principles of the invention.

In the Drawings.

DESCRIPTION OF THE PREFERRED EMBODIMENTS

Reference will now be made in detail to the construction and operation of preferred embodiments of the present invention, which are illustrated in the accompanying drawings. In those drawings, like elements and operations are designated with the same reference numbers.

Figure 6:
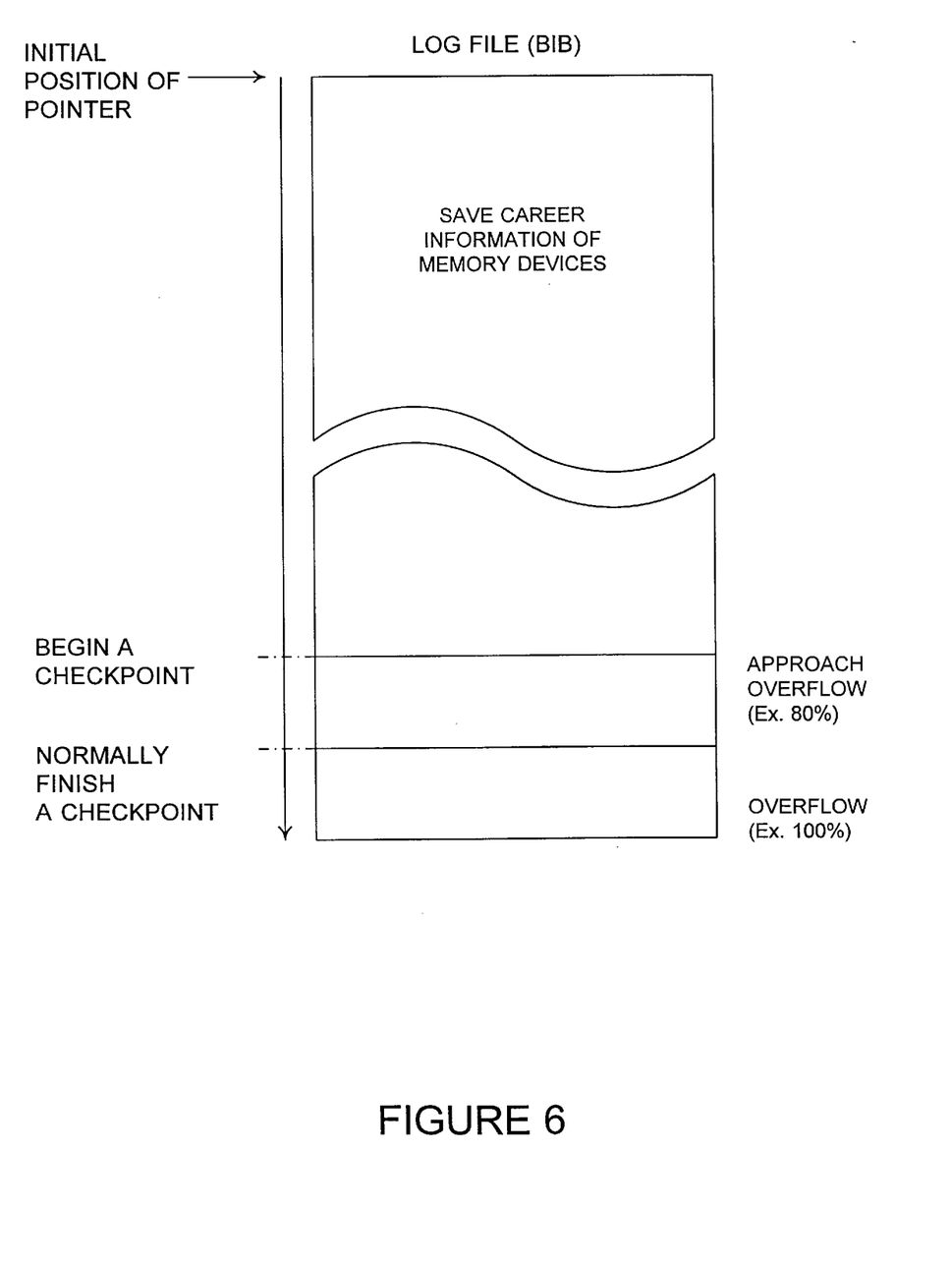
FIG. 6 is a block diagram showing the capacity of a log file (BIB) in view of the execution of checkpoint processing.

The first embodiment of the present invention is explained with reference to FIGS. 1, 2, and 6.

Figure 1:
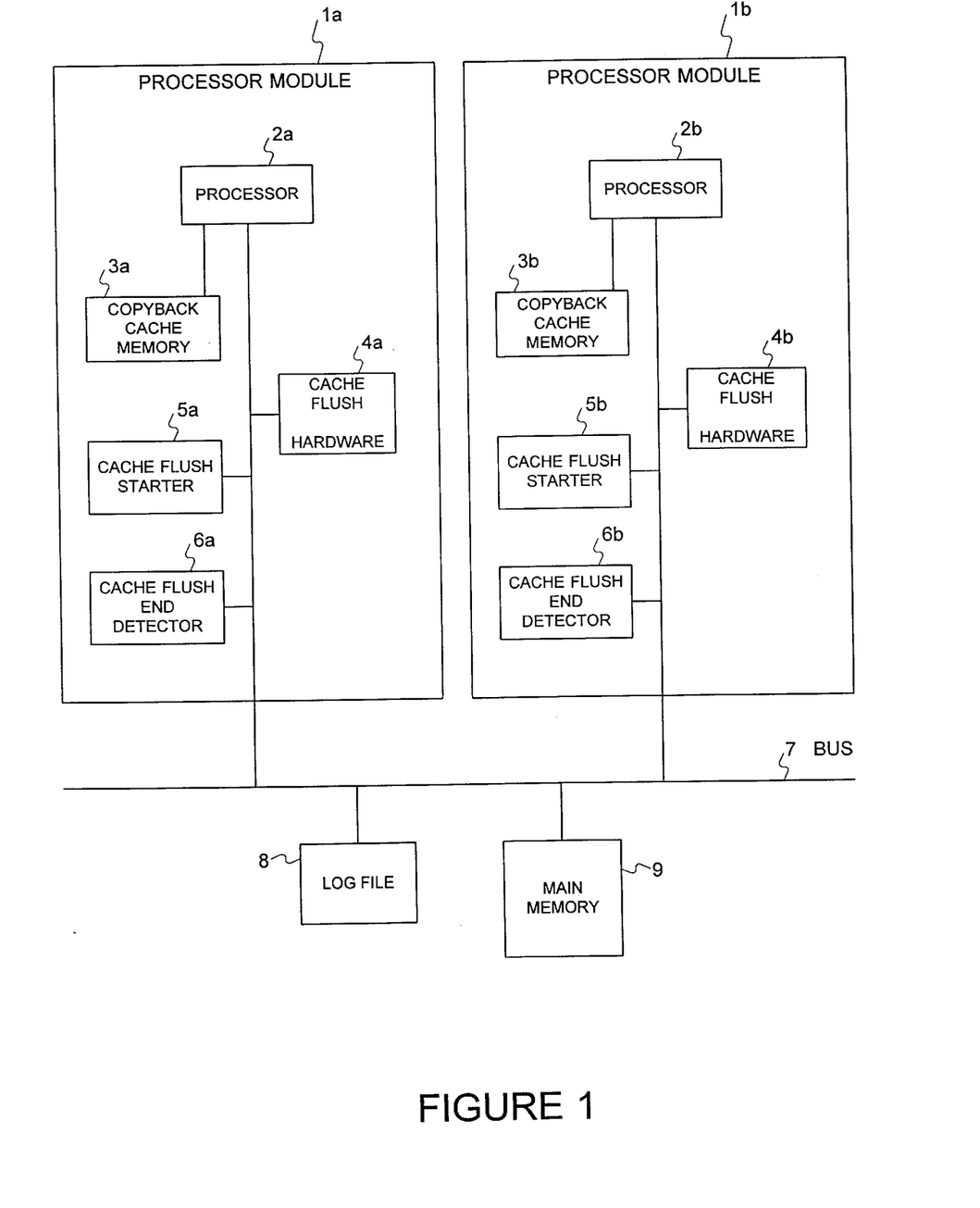
FIG. 1 is a block diagram of a computer system according to a first embodiment of the present invention having two phase checkpoint processing.

The computer system of the present invention is a multiprocessor system, as shown in FIG. 1, with two processor modules 1a and 1b. Each processor module performs the normal data processing of the computer system. The processor module 1a includes a processor 2a, and a copyback type cache 3a, cache flush hardware 4a, a cache flush starter 5a, and a cache flush end detector 6a. The processor module 1b similarly includes a processor 2b, a copyback type cache 3b, cache flush hardware 4b, a cache flush starter 5b, and a cache flush end detector 6b. The computer system also has a log file 8 and a main memory 9 connected to the processors 1a and 1b by a bus 7.

An embodiment of the cache flush hardware 4a and 4b is disclosed in U.S. patent application Ser. No. 08/653,905, now U.S. Pat. No. 5,696,135, the contents of which are hereby incorporated by reference filed by the same applicant. The cache flush hardware 4a of the processor module 1a keeps track of the dirty data addresses of the cache memory 3a in a table (not shown) by observing the bus commands exchanged between the cache memories 3a and 3b and the main memory 9. When the cache flush hardware 4a is invoked by the cache flush starter 5a, the cache flush hardware 4a begins to check whether each entry of the table has a modified data address. When the cache flush hardware 4a finds a modified data address, it issues a bus command requiring the cache memory 3a to write back the modified data into the main memory 9. The cache flush hardware 4a finishes the cache flush execution when all entries of the table have been examined.

The cache flush starters 5a and 5b start the cache flush hardware 4a and 4b, respectively. The cache flush end detectors 6a and 6b detect, respectively, whether the cache flush hardware 4a and 4b has finished the cache flush execution.

The log file 8 is a hardware device that records the "before" image of the main memory 9. An embodiment of the log file 8 is disclosed in U.S. patent application Ser. No. 08/632,113, the contents of which are hereby incorporated by reference filed by the same applicant. When the cache memories 3a and 3b issue a bus command indicating that data is modified, the log file 8 records the pair of memory addresses and the previous data of the main memory 9. The pair will be called the "before image". When the log file 8 is reset, all the before images are discarded.

In the computer system of the present invention, the processors 2a and 2b acquire a checkpoint in the main memory 9 synchronously. A checkpoint is a state in which the context of the processors 2a and 2b is saved in the main memory 9 and all the modified data in the cache memories 3a and 3b has been written back into the main memory 9. At the end of a checkpoint operation, the log file 8 is reset and the processors 2a and 2b resume normal data processing.

When a fault occurs, the computer system performs the following steps. First, the processors 2a and 2b try to remove the cause of the fault. When the cause of the fault cannot be removed successfully, a system down occurs as in a conventional computer. When the cause of the fault is removed successfully, the processors 2a and 2b reset their respective cache memories 3a and 3b and then restore the latest checkpoint by writing back the before image from the log file 8 into the main memory 9. Finally, the processors 2a and 2b load the context of the processors 2a and 2b and resume normal data processing.

The steps performed by the computer system to take a checkpoint are explained with reference to FIG. 2. During normal data processing (step A1 in FIG. 2), the remaining capacity of the log file 8 decreases steadily. When the remaining capacity of the log file 8 goes below a predetermined threshold (Y of step A2 in FIG. 2), a first phase checkpoint step of the present invention begins. The predetermined threshold may be around 20% of the capacity of the log file 8.

Figure 2:
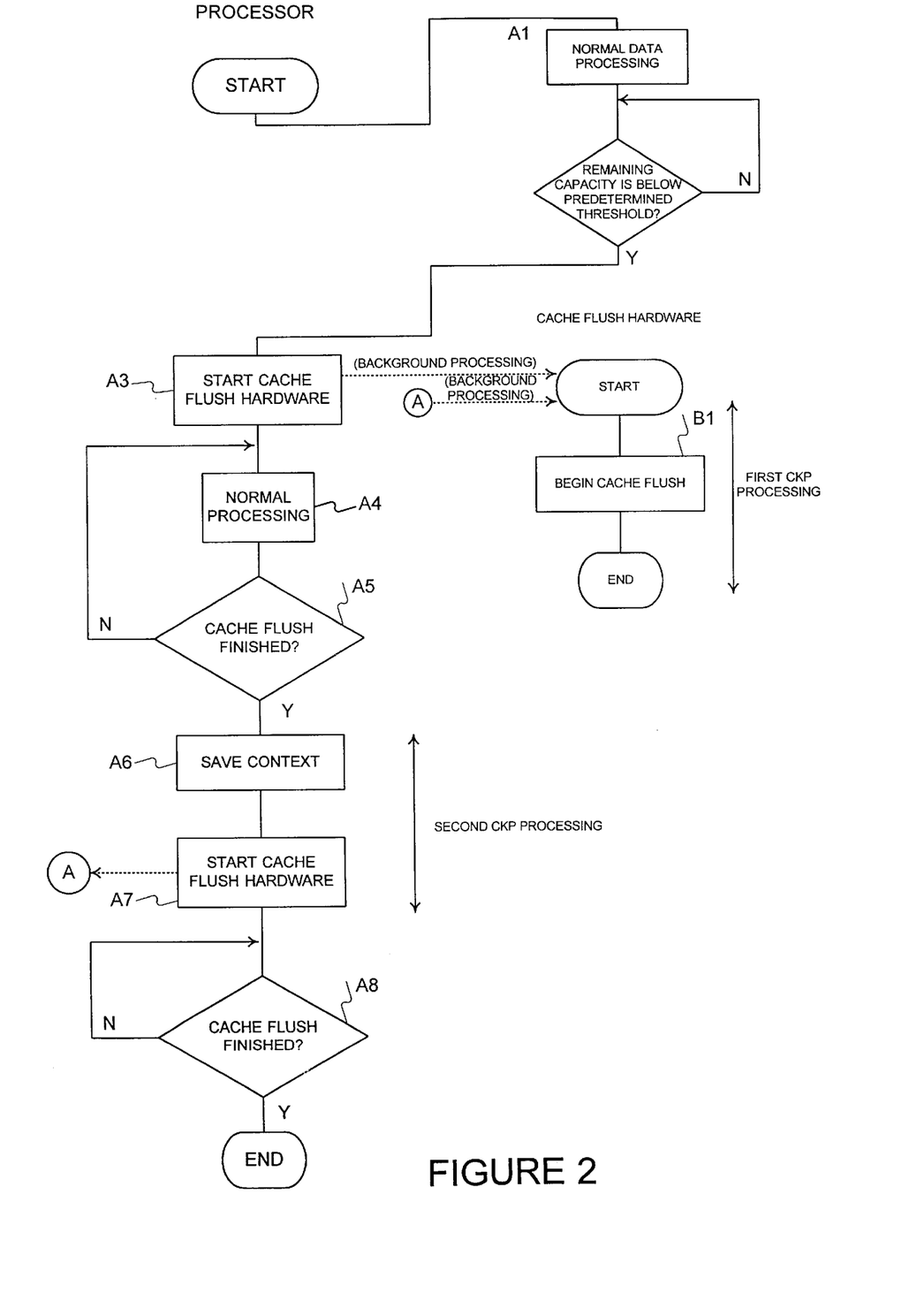
FIG. 2 is a flow chart showing the operation of the two phase checkpoint processing according to the first embodiment of the present invention.

The processors 2a and 2b invoke the cache flush hardware 4a and 4b by using the cache flush starters 5a and 5b (step A3 in FIG. 2). While the cache flush hardware 4a and 4b is running, the processors 2a and 2b continue normal data processing (step A4 in FIG. 2). An interrupt from an external device will be handled by one of the processors 2a and 2b. The normal data processing generates newly modified data in the cache memories 3a and 3b. This data may or may not be written back into the main memory 9 depending on whether the cache block of the newly modified data is to be examined or has already been examined by the cache flush hardware 4a and 4b.

When the cache flush end detectors 6a and 6b notify the processors 2a and 2b that the cache flush hardware 4a and 4b has finished execution (Y of step A5 in FIG. 2), the first phase checkpoint step ends and the second phase checkpoint step begins.

At the beginning of the second phase checkpoint step, the processors 2a and 2b suspend normal data processing and save the context, namely the contents of the registers, within the processors 2a and 2b into the main memory 9 (step A6 in FIG. 2).

Then, the processors 2a and 2b invoke the cache flush hardware again (step A7 in FIG. 2) and wait for the end of execution (step A8 in FIG. 2). The cache flush hardware 4a and 4b flushes all the modified data in the cache memories 3a and 3b this time because any newly modified data is not generated by the normal data processing. The above described second phase checkpoint step is the same as the checkpoint step of conventional computer systems.

Since the cache flush hardware 4a and 4b runs at the first phase checkpoint step (step B1 in FIG. 2) in the background of normal data processing (step A4 in FIG. 2), the amount of modified data in the cache memory 3a and 3b at the beginning of the second phase checkpoint step is decreased compared with that at the beginning of the first phase checkpoint step. Therefore, in the computer system of the present invention, the required time for the cache flush operation at the second checkpoint step is much less than that of conventional computer systems.

The second embodiment of the present invention is explained with reference to FIG. 3 and FIG. 4.

Figure 3:
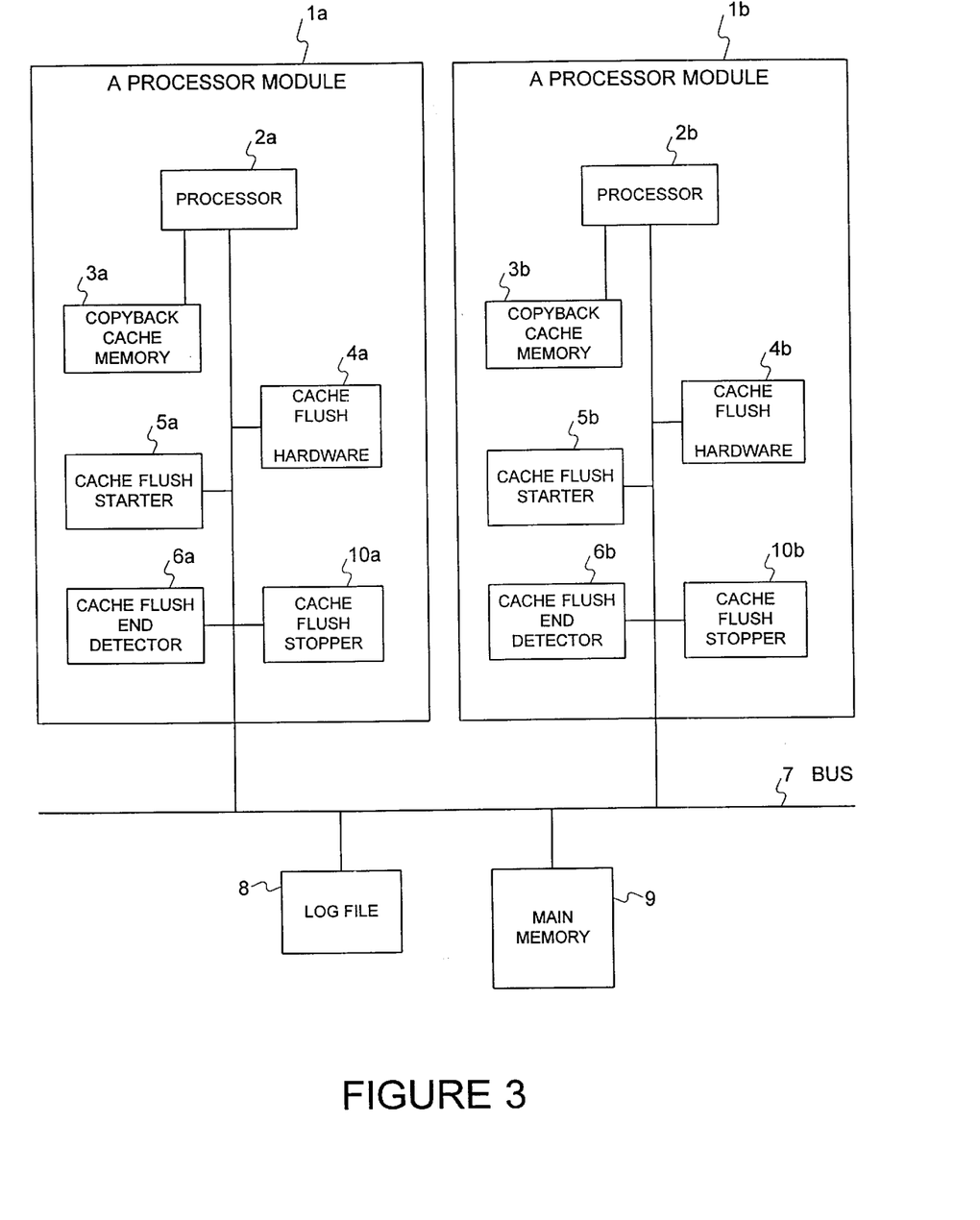
FIG. 3 is a block diagram of a computer system according to a second embodiment of the present invention having two phase checkpoint processing.

FIG. 3 is a block diagram of a computer system according to a second embodiment of the present invention having two phase checkpoint processing.

The second embodiment of the present invention has cache flush stoppers 10a and 10b in processor modules 1a and 1b, respectively, in addition to the components of the first embodiment, shown in FIG. 1. The cache flush stoppers 10a and 10b stop the cache flush operation of the cache flush hardware 4a and 4b invoked by the cache flush starters 5a and 5b.

Figure 4:
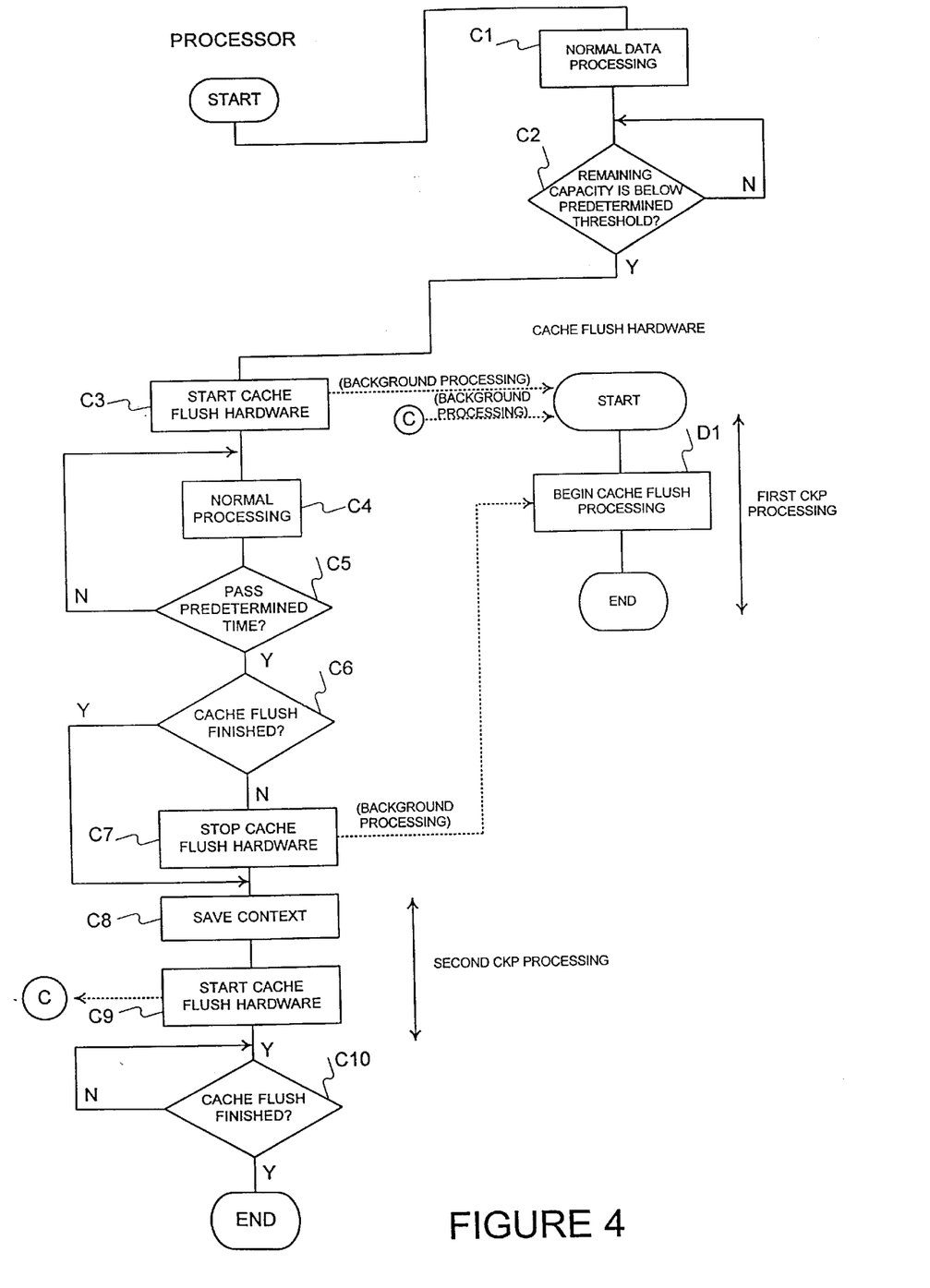
FIG. 4 is a flow chart showing the operation of the two phase checkpoint processing according to the second embodiment of the present invention.

Because the first and second embodiments of the present invention differ only in a part of the first phase checkpoint step as a result of the addition of the cache flush stoppers 10a and 10b in the second embodiment, the explanation of the second embodiment will be focused on the first phase checkpoint step, referring to FIG. 4.

At the beginning of the first phase checkpoint, the processors 2a and 2b invoke the cache flush hardware 4a and 4b (step C3 in FIG. 4) and continue normal data processing (step C4 in FIG. 4) in the same way as in the first embodiment.

The second embodiment of the present invention is different from the first embodiment in determining the end of the first phase checkpoint step. While the processors 2a and 2b in the first embodiment continue normal data processing until the termination operation of the cache flush hardware 4a and 4b, the processors 2a and 2b, in the second embodiment, continue normal data processing for a predetermined time period (step C5 in FIG. 4). Then, the processors 2a and 2b check whether the cache flush hardware 4a and 4b terminates operation (step C6 in FIG. 4). If not (N of step C6 in FIG. 4), the processors 2a and 2b stop the cache flush hardware 4a and 4b using the cache flush hardware stoppers 10a and 10b (step C7 in FIG. 4). Here, the first phase checkpoint step ends and the second phase checkpoint begins.

The second embodiment of the present invention has an advantage in that the risk of overflow of the log file 8 can be avoided by setting the predetermined time period (used in step C5 in FIG. 4) properly.

Even more efficient processing of the computer system is achieved by combining the first and second embodiments of the present invention, as explained with reference to FIG. 5.

Figure 5:
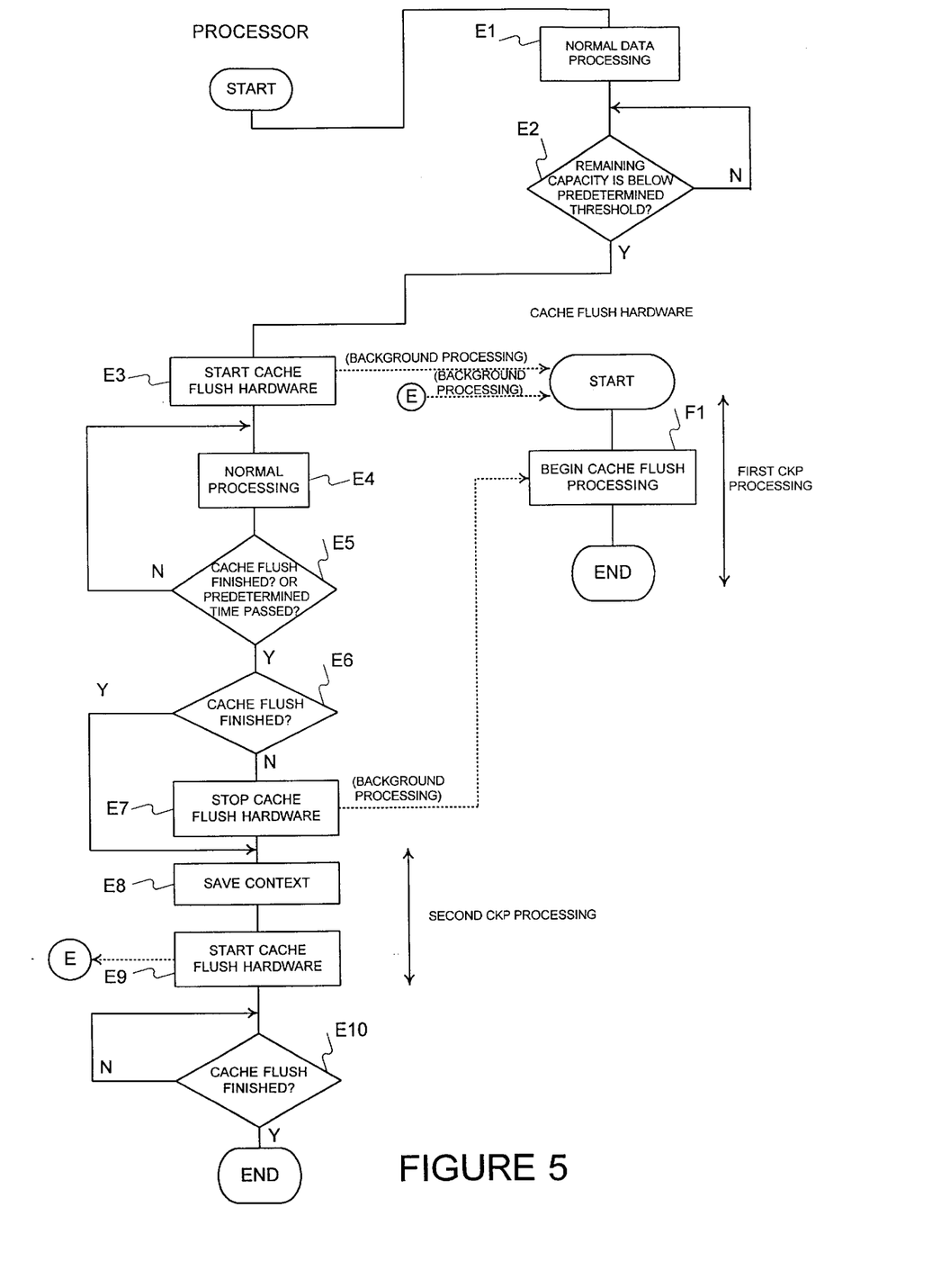
FIG. 5 is a flow chart showing the operation of two phase checkpoint processing according to a third embodiment of the present invention.

FIG. 5 is a flowchart showing the operation of the two phase checkpoint processing according to a third embodiment of the present invention.

As in the first and second embodiments, the processors 2a and 2b invoke the cache flush hardware 4a and 4b using the cache flush starters 5a and 5b (step E3 in FIG. 5) and continue normal data processing (step E4 in FIG. 5) at the beginning of the first phase checkpoint step.

When a predetermined time has passed or the cache flush end detectors 6a and 6b detect the termination of operation by the cache flush hardware 4a and 4b (Y of step E5 in FIG. 5), the processors 2a and 2b suspend normal data processing.

If the cache flush hardware 4a and 4b operation has not terminated yet (N of step E6 in FIG. 5), the processors 2a and 2b stop the cache flush hardware 4a and 4b using the cache flush stoppers 10a and 10b (step E7 in FIG. 5). Here the first phase checkpoint step ends and the second phase checkpoint begins.

As a result, the processing time of the first checkpoint operation, compared with the first and the second embodiments, is optimized and, in addition the processing efficiency of the system is improved.

A key point of the present invention is the presence of the first phase checkpoint step. In the first through third embodiments of the present invention, the first phase checkpoint is executed once before the second phase checkpoint step. However, in accordance with the principles of the present invention, it is possible for the first phase checkpoint step to be executed two or more times before the second phase checkpoint step.

Figure 7A:
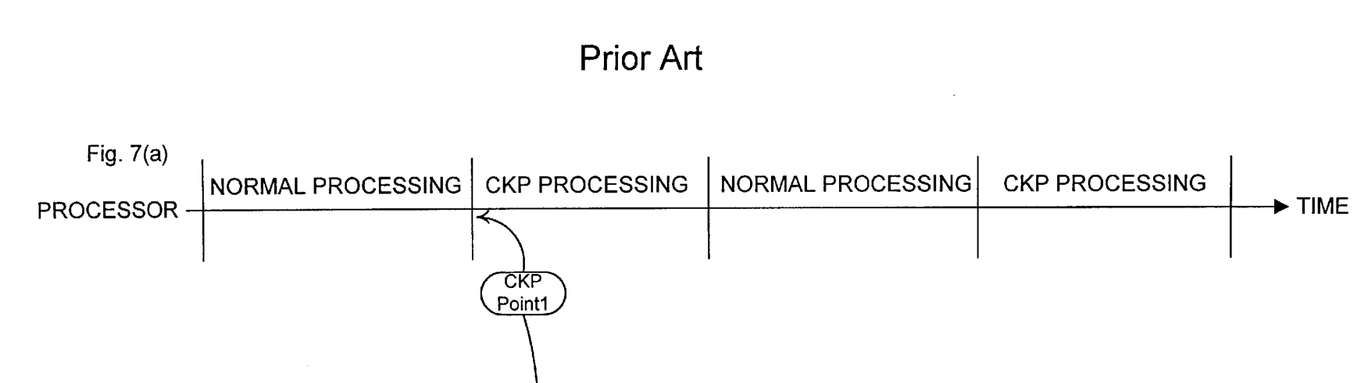
FIG. 7(a) is a time chart of conventional checkpoint processing.
Figure 7B:
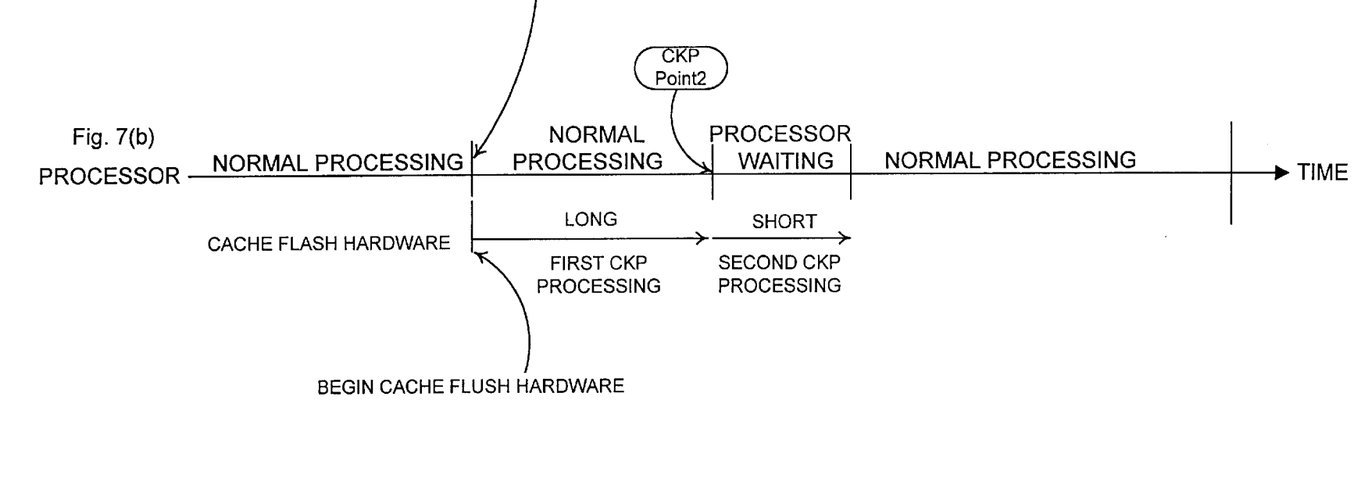
FIG. 7(b) is a time chart of the two phase checkpoint processing according to the present invention.

Next, an advantage of the present invention is explained by comparison with conventional checkpoint processing, referring to the time charts of FIGS. 7(a) and 7(b).

Normal data processing and the checkpoint processing of the processors 2a and 2b are alternately executed, as show in FIG. 7(a). It is assumed that the checkpoint processing begins at CKP1 in both FIGS. 7(a) and 7(b).

As shown in FIG. 7(a) the processors execute the checkpoint processing only in one phase. Namely, at CKP1, the processors suspend normal data processing, save the context of the processors, and invoke the cache flush hardware. Most of the time required for this checkpoint processing is consumed during the cache flush operation. The main disadvantage is that the processors can not execute normal processing for this lengthy period. A simulation study showed that the dirty part of the cache memory at CKP1 is around 30% and the cache flush operation takes several milliseconds or more depending on the cache memory capacity and the number of processors of the computer systems. From outside the computer system, it appears to stop completely during this period.

According to the present invention, as shown in FIG. 7(b), during the first phase checkpoint step (CKP1), the computer system performs normal data processing though system performance may decrease. The degree of performance degradation depends mainly on the system bus busy ratio of normal data processing. If it is less than 50%, the performance degradation may be negligible. If it is close to 100%, system performance might be down by around 50%. Because of the first phase checkpoint step, the second phase checkpoint takes less time. The simulation study showed the required time for the second phase checkpoint step decreased from 35 to 75%.

While there has been illustrated and described what are considered to be preferred embodiments and methods of the present invention, it will be understood by those skilled in the art that various changes and modifications may be made, and equivalents may be substituted for elements thereof without departing from the true scope of the invention.

In addition, many modifications may be made to adapt a particular element, technique or implementation to the teachings of the present invention without departing from the central scope of the invention. Therefore, it is intended that this invention not be limited to the particular embodiments and methods disclosed herein, but that the invention involve all embodiments falling within the scope of the appended claims.

What is claimed is:

1. A computer system having a processor, a main memory, and a copyback type cache memory, wherein the computer system periodically stores contents of the cache memory into the main memory to get a checkpoint on the main memory, and achieves a recovery from a fault by restarting from the checkpoint when a fault occurs, the computer system comprising:

cache flush execution means for flushing the cache memory independently of normal data processing executed by the processor;

cache flush start means for invoking the cache flush execution means; and cache flush end detection means for detecting whether the cache flush execution means has finished flushing the cache memory;

wherein, in a first phase checkpoint, the processor commands the cache flush start means to invoke the cache flush execution means, the processor performing normal data processing while the cache flush execution means flushes the cache memory; and wherein, in a second phase checkpoint, which starts when the cache flush end detection means detects the completion of the cache flush performed in the first phase checkpoint, the processor saves a state of the processor into the main memory and commands the cache flush start means to invoke the cache flush execution means, the processor suspending the normal data processing while the cache flush execution means flushes the cache memory.

2. The computer system of claim 1, further comprising a log file memory for recording data of the main memory by storing instructions of the processor after a latest checkpoint, and wherein, when in the second phase checkpoint, the log file memory is reset.

3. The computer system of claim 1, the processor including fault recovery means for restoring a latest checkpoint in the main memory and for restarting the normal data processing when a fault occurs.

4. A computer system having a processor, a main memory, a copyback type cache memory, the computer system periodically storing contents of the processor and the cache, memory into the main memory to get a checkpoint on the main memory, and achieving a recovery from a fault by restarting from the checkpoint when a fault occurs, the computer system comprising:

cache flush execution means for flushing the cache memory independently of normal data processing executed by the processor;

cache flush start means for invoking the cache flush execution means;

cache flush end detection means for detecting whether the cache flush execution means has finished flushing the cache memory; and cache flush stop means for stopping the execution of the cache flush execution means;

wherein, in a first phase checkpoint, the processor commands the cache flush start means to invoke the cache flush execution means, the processor performing normal data processing while the cache flush execution means flushes the cache memory; and wherein, in a second phase checkpoint, which starts after a first period of processing time has elapsed since the start of the first phase checkpoint, the processor commands the cache flush stop means to stop the execution of the cache flush execution means and saves a state of the processor into the main memory and commands the cache flush start means to invoke the cache flush execution means, the processor suspending the normal data processing while the cache flush execution means flushes the cache memory waiting for termination of the cache flush execution means detected by the cache flush end.

5. The computer system of claim 4, the processor including fault recovery means for restoring a latest checkpoint in the main memory and for restarting the normal data processing in case a fault occurs.

6. The computer system of claim 4, further comprising a log file memory for recording data of the main memory by storing instructions of the processor after a latest checkpoint, and wherein the log file memory is reset.

7. In a computer system, a method of periodically storing contents of a processor and a cache memory into a main memory to get a checkpoint on the main memory and to recover from a fault by restarting from the checkpoint when a fault occurs, the method comprising the steps of:

executing a first phase checkpoint step where a cache flush operation and normal data processing are performed simultaneously;

detecting whether the first phase checkpoint step is complete; and executing a second phase checkpoint step, wherein a cache flush operation is performed and any normal data processing is suspended until completion of the second phase checkpoint step.

8. The method of claim 7, wherein the second phase checkpoint step includes the step of storing contents of the processor into the main memory.

9. The method of claim 7, further comprising the step of resetting a log file memory for recording a before image of the main memory at the end of the second phase checkpoint step.

10. The method of claim 7, further comprising the steps of:

determining whether the first phase checkpoint step has been performed for a predetermined time; and stopping the execution of the cache flush operation if the first phase checkpoint step has not ended after the predetermined time.

* * * * *